(12) United States Patent
Ito et al.

(10) Patent No.: US 11,945,436 B2
(45) Date of Patent: Apr. 2, 2024

(54) DRIVING ASSIST METHOD AND DRIVING ASSIST DEVICE

(71) Applicant: Nissan Motor Co., Ltd., Yokohama (JP)

(72) Inventors: Atsushi Ito, Kanagawa (JP); Shohei Nakamura, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 312 days.

(21) Appl. No.: 17/607,450

(22) PCT Filed: Mar. 30, 2020

(86) PCT No.: PCT/JP2020/014517
§ 371 (c)(1),
(2) Date: Oct. 29, 2021

(87) PCT Pub. No.: WO2020/230467
PCT Pub. Date: Nov. 19, 2020

(65) Prior Publication Data
US 2022/0219688 A1  Jul. 14, 2022

(30) Foreign Application Priority Data

May 15, 2019 (JP) .................................. 2019-092443

(51) Int. Cl.
*B60W 30/12* (2020.01)
*B60W 30/16* (2020.01)
(Continued)

(52) U.S. Cl.
CPC ............ *B60W 30/12* (2013.01); *B60W 30/16* (2013.01); *B60W 50/14* (2013.01); *B60W 60/0055* (2020.02); *B60W 2555/60* (2020.02)

(58) Field of Classification Search
CPC ...... B60W 30/12; B60W 30/16; B60W 50/14; B60W 60/0055; B60W 2555/60;
(Continued)

(56) References Cited

U.S. PATENT DOCUMENTS

2015/0006028 A1   1/2015  Strauss
2016/0264147 A1*  9/2016  Mueller ................ B60W 40/08
(Continued)

FOREIGN PATENT DOCUMENTS

CN     107107919 A    8/2017
JP     2000-20898 A   1/2000
(Continued)

*Primary Examiner* — Tyler D Paige
(74) *Attorney, Agent, or Firm* — Global IP Counselors, LLP

(57) ABSTRACT

A vehicle speed/headway control function and a lane-keeping function are provided as driving assist functions to assist in a driving operation by a driver. A mode-switching controller is provided for switching between the modes. In the lane-keeping assist mode, it is assessed whether or not a traveling condition has been met that an actual vehicle speed of the host vehicle exceeds a speed limit of a roadway on which the host vehicle is traveling during lane-keeping travel in which "hands-off mode," which allows the driver to remove their hands from the steering wheel, has been selected. The mode is switched from "hands-off mode" to "hands-on mode," which has as a condition that the driver has their hands on the steering wheel, upon assessing that the traveling condition that the actual vehicle speed exceeds the speed limit has been met.

7 Claims, 6 Drawing Sheets

(51) Int. Cl.
*B60W 50/14* (2020.01)
*B60W 60/00* (2020.01)
*G08G 1/16* (2006.01)

(58) Field of Classification Search
CPC ............. B60W 2520/10; B60W 30/14; B60W 2050/0095; B60W 2540/10; G08G 1/167
USPC .......................................................... 701/23
See application file for complete search history.

(56) References Cited

U.S. PATENT DOCUMENTS

2017/0008561 A1* 1/2017 Kinugasa ............. B62D 15/025
2018/0326994 A1* 11/2018 Sakai ................... G05D 1/0061

FOREIGN PATENT DOCUMENTS

JP         2018-20781 A    2/2018
JP        2019-185211 A   10/2019

\* cited by examiner

DRIVING ASSIST METHOD AND DRIVING ASSIST DEVICE

CROSS-REFERENCE TO RELATED APPLICATIONS

This application is a U.S. national stage application of International Application No. PCT/JP2020/014517, filed on Mar. 30, 2020, which claims priority to Japanese Patent application No. 2019-092443, filed on May 15, 2019.

BACKGROUND

Technical Field

The present disclosure relates to a driving assist method and a driving assist device.

Background Information

Conventionally, in a vehicle-mounted driving assist device that can execute following-travel control to cause a host vehicle to travel automatically so as to follow a leading vehicle, a speed limit acquisition unit acquires a speed limit of a roadway on which the host vehicle is traveling. A notification speed decision unit decides on a notification speed on the basis of the speed limit. A notification unit issues a notification if a travel speed of the host vehicle has reached or exceeded the notification speed. A device that makes the announcement speed lower when following-travel control is being executed than when following-travel control is not being executed is a known form of the notification speed decision unit (for instance, see Japanese Laid-open Patent Application No. 2000-20898-Patent Citation 1).

SUMMARY

Conventional devices issue an alarm to a driver if a travel speed of a host vehicle has reached an alarm speed that is based on a speed limit. However, driving assist control to assist driving operation of the driver has a problem in that, as advancements are made in driving assist that raise the level of assistance of driving operations by a driver, a simple alarm may not be able to encourage travel that is based on appropriate driving assistance.

The present disclosure addresses this problem, and the purpose thereof is to encourage travel based on appropriate driving assistance by lowering the driving assistance level if traveling conditions that require alerting the driver are assessed to be present in a lane-keeping travel scenario with a raised driving assistance level.

In order to achieve this purpose, the present disclosure relates to driving assist method that has a vehicle speed/headway control function and a lane-keeping function as driving assist functions to assist driving operations by a driver, and that uses a mode-switching controller for switching lane-keeping assist modes that assist a host vehicle to remain within a lane during travel. During lane-keeping travel in which a hands-off mode that allows the driver to remove their hands from the steering wheel has been selected as the lane-keeping assist mode, it is assessed whether or not a traveling condition that an actual vehicle speed of the host vehicle exceeds a speed limit of a roadway on which the host vehicle is traveling has been met. The mode is switched from the hands-off mode to a hands-on mode, which has as a condition that the driver has their hands on the steering wheel, when it is assessed that the traveling condition that the actual vehicle speed exceeds the speed limit has been met.

Adopting the technical solution described above allows travel based on appropriate driving assistance to be encouraged by lowering a driving assistance level if a traveling condition that requires alerting a driver is assessed to be present in a lane-keeping travel scenario with a raised driving assistance level.

BRIEF DESCRIPTION OF THE DRAWINGS

Referring now to the attached drawings which form a part of this original disclosure.

DETAILED DESCRIPTION OF EMBODIMENTS

Figure 1:
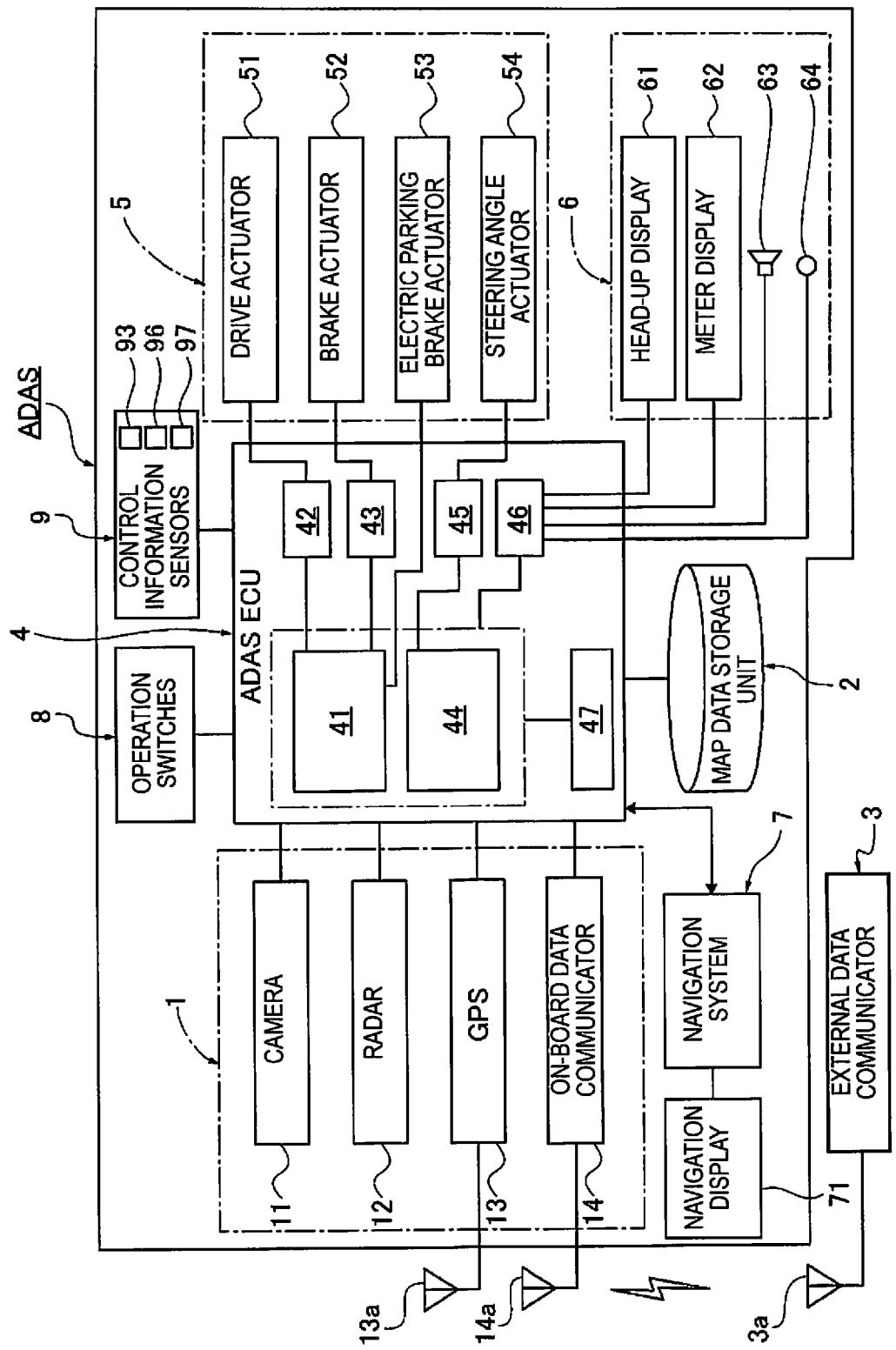
FIG. 1 is an overall system diagram showing an advanced driver assist system to which a driving assist method and a driving assist device of the first embodiment have been applied.

A mode for carrying out a driving assist method and a driving assist device according to the present disclosure will be described below on the basis of a first embodiment, shown in the drawings.

First Embodiment

The driving assist method and the driving assist device in the first embodiment have been applied to a driving-assisted vehicle in which has been installed an advanced driver assist system (ADAS) that assists driving operations by a driver. The configuration of the first embodiment will be divided into "overall system configuration," "configuration of the control block of the mode-switching controller," and "configuration of the control process for switching the lane-keeping assist mode" for description.

Overall System Configuration

Figure 2:
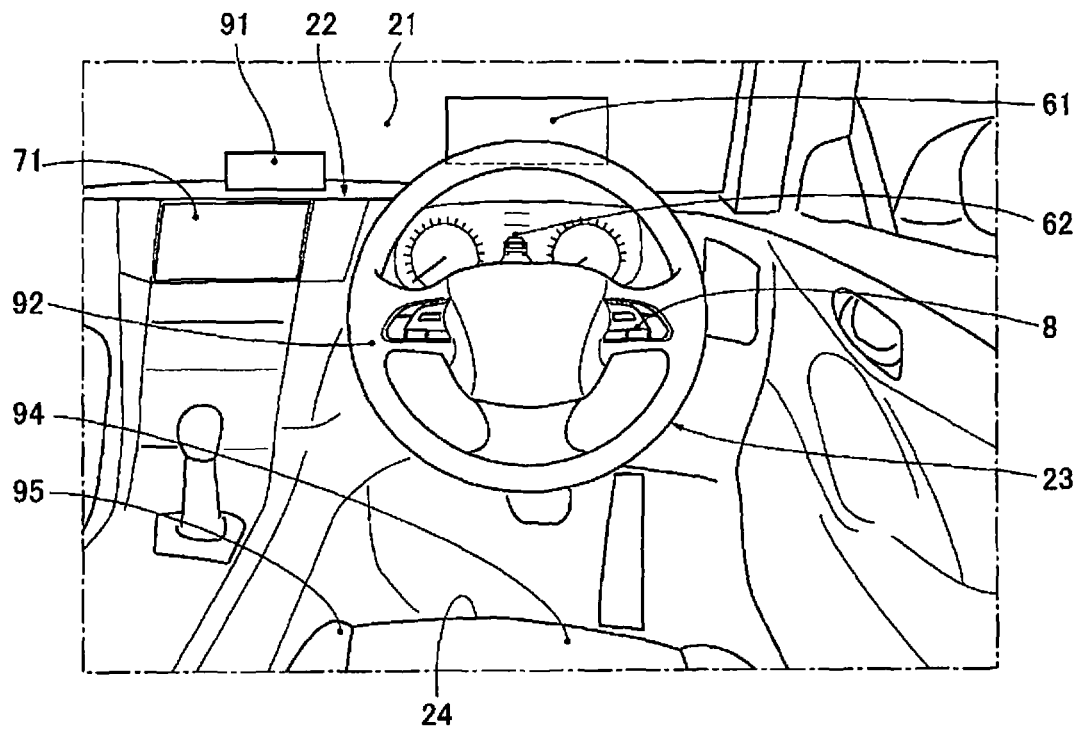
FIG. 2 is a diagram showing a vehicle interior configuration when a windshield is viewed from a driver's seat position in a driving-assisted vehicle.
Figure 3:
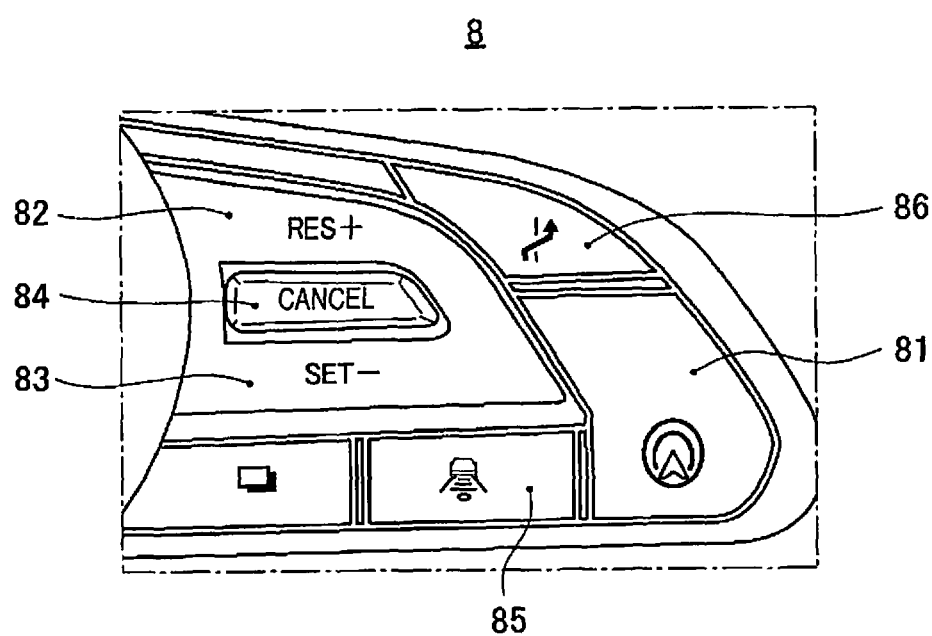
FIG. 3 is an enlarged view showing driver-operated switches that are provided on a steering wheel of the driving-assisted vehicle.

FIG. 1 shows the advanced driver assist system to which the driving assist method and the driving assist device of the first embodiment have been applied. FIG. 2 shows a vehicle interior configuration when a windshield is viewed from a driver's seat position in the driving-assisted vehicle. FIG. 3 shows driver-operated switches provided on a steering wheel of the driving-assisted vehicle. The overall system configuration will be described below on the basis of FIGS. 1-3.

The advanced driver assist system (ADAS) is a system that has a vehicle speed/headway control function and a lane-keeping function. As shown in FIG. 1, the ADAS is provided with on-board sensors 1, a map data storage unit 2, an external data communicator 3, an ADAS control unit 4, an actuator 5, an HMI device 6, a navigation system 7, operation switches 8, and control information sensors 9. "HMI" is an abbreviation for "human-machine interface."

The on-board sensors 1 have a camera 11, a radar 12, a GPS 13, and an on-board data communicator 14. Sensor information acquired by the on-board sensors 1 is output to the ADAS control unit 4.

The camera 11 is a host vehicle surroundings recognition sensor that fulfills a function of acquiring information on host vehicle surroundings, such as a current lane, neighboring lanes, vehicles surrounding the host vehicle, and pedestrians around the host vehicle, from image data. The camera 11 combines a forward recognition camera, a rearward recognition camera, a rightward recognition camera, a leftward recognition camera, and the like, and is configured so as to have an Around View Monitor function. Objects in a host vehicle travel path, lanes, objects outside the host vehicle travel path (roadway structures, preceding vehicles, trailing vehicles, oncoming vehicles, surrounding vehicles, pedestrians, bicycles, and motorcycles), the host vehicle travel path (roadway white lines, roadway boundaries, stop lines, and pedestrian crossings), traffic signs (speed limits), and the like, along with the distances to the objects, are sensed by this camera 11.

The radar 12 is a ranging sensor that fulfills a function of sensing whether or not objects are present in the host vehicle surroundings and a function of sensing a distance to an object in the host vehicle surroundings. Here "radar 12" is a general term that encompasses radar, which uses radio waves; lidar, which uses light; and sonar, which uses ultrasonic waves. The positions of objects in the host vehicle travel path, objects outside the host vehicle travel path (roadway structures, preceding vehicles, trailing vehicles, oncoming vehicles, surrounding vehicles, pedestrians, bicycles, and motorcycles), and the like are sensed by this radar 12.

The GPS 13 has a GNSS antenna and is a host vehicle position sensor that senses the position (latitude and longitude) of a stopped or traveling host vehicle through the use of satellite communication. "GNSS" is an abbreviation for "global navigation satellite system," and "GPS" is an abbreviation for "Global Positioning System."

The on-board data communicator 14 is an external data sensor with which information that cannot be acquired by the on-board sensors 1 or from map data is acquired from outside through wireless communication with an external data communicator 3 via transceiving antennas 3a, 14a. Here, if the "external data communicator 3" is, for instance, a data communicator installed in another vehicle traveling near the host vehicle, vehicle-to-vehicle communication can be carried out between the host vehicle and the other vehicle, and information required by the host vehicle can be acquired through requests from the variety of information held by the other vehicle. Moreover, if the "external data communicator 3" is, for instance, a data communicator provided in an infrastructure facility, infrastructure communication can be carried out between the host vehicle and the infrastructure facility, and information required by the host vehicle can be acquired through requests. For instance, if there is information missing from map data saved in the map data storage unit 2 or information that has been changed from the map data, the missing or changed information can be supplemented. It is also possible to acquire traffic information such as information on traffic jams on a travel route of the host vehicle, or travel regulation information.

The map data storage unit 2 is configured from on-board memory in which is stored so-called electronic map data, in which latitude/longitude and map information are associated. The map data stored in the map data storage unit 2 is high-accuracy map data with accuracy of a level that fundamentally allows recognition of lanes, with the exception of geographical areas for which there is no high-accuracy map data. When the position of the host vehicle sensed by the GPS 13 is recognized by the ADAS control unit 4, the high-accuracy map data for a prescribed range centered on the position of the host vehicle is sent to the ADAS control unit 4 and the navigation system 7.

Here, "high-accuracy map data" has roadway information associated with geographic points, and the roadway information is defined by nodes and links that connect the nodes. The roadway information includes information that specifies roadways by the positions or regions of the roadways and information on roadway types of each roadway, lane widths of each roadway, and shapes of roadways. The roadway information is stored so that positions of intersections, entry directions of intersections, types of intersections, and other information relating to intersections are associated with each set of identifying information on roadway links. Moreover, the roadway information is stored so that roadway types, lane widths, roadway shapes, whether or not straight driving is possible, advancement precedence relationships, whether or not passing is possible (whether or not neighboring lanes can be entered), speed limits, signs, and other information relating to roadways are associated with each set of identifying information on roadway links.

The ADAS control unit 4 is a unit that integrates driving assist control, and has an accelerator/brake assist controller 41, a travel drive source controller 42, and a brake controller 43 as controllers that share the vehicle speed/headway control function. J, The ADAS control unit 4 also has a steering wheel assist controller 44 and a steering controller 45 as controllers that share the lane-keeping function. Furthermore, in the case of the advanced driver assist system (ADAS), the ADAS control unit 4 has an HMI controller 46 as a controller that shares the function of providing communication between the driver and the system. In addition, in the case of the advanced driver assist system (ADAS), the ADAS control unit 4 has a mode-switching controller 47 that controls switching lane-keeping assist modes in conjunction with the raising of the level of driving assistance to a "hands-off mode M1" that allows the driver to take their hands off of the steering wheel.

The accelerator/brake assist controller 41 performs the following control to assist accelerator operation and brake operation by the driver.

(a) When a preceding vehicle is detected, headway is controlled so that a vehicle speed set by the driver is taken as an upper limit and a headway distance corresponding to the vehicle speed is maintained.

(b) If no preceding vehicle is detected, the vehicle travels steadily at the set vehicle speed.

(c) When the preceding vehicle has stopped, the host vehicle is also stopped after the preceding vehicle.

(d) When the preceding vehicle has advanced, the stopped state is released and following-travel is resumed if a resume/accelerate switch 82 (see FIG. 3) is pressed or an accelerator pedal is depressed.

(e) When the host vehicle has stopped under the vehicle speed/headway control function, an electric parking brake is activated by a command to an electric parking brake actuator 53 if a system release operation is performed.

In addition to the vehicle speed/headway control based on (a)-(e) above, generally known as "cruise control," the accelerator/brake assist controller 41 performs the control described below.

(f) When the host vehicle is traveling under the vehicle speed/headway control function, alteration (raising or lowering) of the set vehicle speed through operation of switches by the driver is permitted.

(g) If a new speed limit has been detected by a speed limit sign sensing function, a speed limit assist display blinks, "the set vehicle speed has been altered" is displayed on a display, and the set vehicle speed is made to reflect the detected speed limit. However, the speed limit is not reflected in the set speed in cases in which the set vehicle speed has been set to a speed higher than the speed limit through operation of switches by the driver and then the set vehicle speed is not exceeded, even if the speed limit has risen (speed limit assist).

(h) When the host vehicle is traveling under the vehicle speed/headway control function, acceleration is allowed if the accelerator pedal is depressed when the driver wishes to accelerate temporarily. Brake control, proximity warnings, and curve warnings are not issued when the accelerator pedal is being operated and acceleration is occurring. If the accelerator pedal is released, the previous vehicle speed/headway control is restored.

(i) When the host vehicle is traveling under the vehicle speed/headway control function, deceleration is allowed if the brake pedal is depressed when the driver wishes to decelerate temporarily. When the driver wishes to reset to the set vehicle speed that was in effect prior to deceleration, the resume/accelerate switch 82 (see FIG. 3) is pressed.

(j) When a curved road is being traveled, vehicle speed is controlled so that the vehicle can travel at a vehicle speed corresponding to the size of curves ahead on the basis of the map information.

If a target vehicle speed is generated by the accelerator/brake assist controller 41, the travel drive source controller 42 performs longitudinal control in which a drive command value is computed and output to a drive actuator 51 so that an actual vehicle speed of the host vehicle will reach the target vehicle speed.

If a target braking deceleration is generated by the accelerator/brake assist controller 41, the brake controller 43 performs longitudinal control in which a braking command value is computed and output to the brake actuator 52 so that an actual braking deceleration of the host vehicle will reach the target braking deceleration.

The steering wheel assist controller 44 exercises the lane-keeping function, in which steering control (lateral control) is performed and steering operation of the driver is assisted so that the host vehicle travels in a central section of the lane on the basis of detection of lane markers on both sides of the lane by the forward recognition camera.

If a target steering angle is generated by the steering wheel assist controller 44 for the host vehicle to travel the central section of the lane, the steering controller 45 performs lateral control in which a steering angle command value is computed and output to a steering angle actuator 54 so that an actual steering angle of the host vehicle will reach the target steering angle.

The HMI controller 46 generates a display command to a head-up display 61 and a meter display 62 so that working states of the vehicle speed/headway control function and the lane-keeping function, and changes in these working states, can be recognized visually. For instance, when "hands-off mode" and "hands-on mode" are to be displayed, a display differentiating modes by color, an icon display, or a message display are utilized so that the driver can ascertain the working state at a glance. Moreover, an audio signal to a speaker 63 is generated when an announcement to the driver that appeals to the auditory sense becomes necessary, and an activation/stop command for an alarm 64 is generated when a warning to the driver that appeals to the auditory sense becomes necessary.

Here, the head-up display 61 of the HMI device 6 is set at a lower position in the windshield 21, as shown in FIG. 2, and the head-up display 61 displays system states and the like on the windshield using a lamplight apparatus. The meter display 62 is set in a gauge display unit of an instrument panel 22 and displays system working states, nearby vehicle states, and the like. The speaker 63 and the alarm 64 are set at prescribed positions on the inner side of a panel of the instrument panel 22.

During lane-keeping travel in which hands-off mode has been selected, the mode-switching controller 47 assesses whether or not the traveling condition has been met that the actual vehicle speed of the host vehicle exceeds a speed limit of a roadway on which the host vehicle is traveling. Control is performed in which the mode is switched from hands-off mode to hands-on mode if it is assessed that the traveling condition that the actual vehicle speed exceeds the speed limit has been met.

Here, "hands-off mode" denotes a lane-keeping assist mode that allows the driver to remove their hands from the steering wheel 23. "Hands-on mode" denotes a lane-keeping assist mode that has as a condition that the driver has their hands on the steering wheel 23. That is, "hands-off mode" and "hands-on mode" are modes that differ only in that the driver is allowed to remove their hands from the steering wheel 23 or is required to have their hands on the steering wheel 23, rather than modes that alter the actual driving assist control. Thus, if "hands-off mode" is selected, the vehicle can travel in an autonomous driving state with the driver completely unengaged in driving operations. If "hands-on mode" is selected, which lowers the level of driving assistance from "hands-off mode," the vehicle travels in a state in which the driver is prepared for a transition to steering wheel operation, even if the driver is not directly engaged in steering wheel operation.

The navigation system 7 is a system that combines map data stored in the map data storage unit 2 with the GPS 13, which uses satellite communication, and, if a destination is set, generates a travel route from the current position of the host vehicle to the destination and navigates the host vehicle to the destination. When the travel route is generated, a roadway map display is displayed together with the travel route and a host vehicle icon on a navigation display 71. The navigation display 71 is disposed in an upper central position in the instrument panel 22, as shown in FIG. 2, and has a function for setting the destination through, inter alia, touch operations by the driver.

As shown in FIG. 2, the operation switches 8 are set at a position on a steering hub that links a steering wheel rim and a steering wheel shaft of the steering wheel 23, where they can be finger-operated while the driver is still holding the steering wheel rim. The operation switches 8 have a main switch 81, a resume/accelerate switch 82, a set/coast switch 83, a cancel switch 84, a headway adjustment switch 85, and a lane-change assist switch 86. The main switch 81 is a switch for powering the system on or off. The resume/accelerate switch 82 has a function for reactivation following deactivation at the set vehicle speed that was in effect before deactivation, a function for raising the set vehicle speed, and a function for resuming advancement after the host vehicle has stopped so as to follow a preceding vehicle. The set/coast switch 83 has a function for activation at a traveling vehicle speed and a function for lowering the set vehicle speed. The cancel switch 84 is a switch that cancels activation. The headway adjustment switch 85 is a switch that toggles between established headway settings. The lane-change assist switch 86 is a switch that issues an instruction for a lane change to be started when the system has confirmed the start of a lane change with the driver.

Here, after the main switch 81 has been pressed, if the vehicle accelerates or decelerates to a desired set vehicle speed and the set/coast switch 83 is pressed, the speed limit of the roadway being traveled is used as the set vehicle speed, and driving assist control by the ADAS control unit 4 is activated. If no speed limit has been detected for the roadway being traveled, or if speed limit assist has been turned off, the speed when the set/coast switch 83 was pressed will be used as the set vehicle speed, and driving assist control by the ADAS control unit 4 is activated.

Driving assist control by the ADAS control unit 4 is deactivated when the cancel switch 84 is pressed, when the main switch 81 is pressed, or when the brake pedal is depressed (unless the host vehicle has been stopped by the vehicle speed/headway control function).

The control information sensors 9 acquire information necessary to the execution of driving assist control by the ADAS control unit 4. As shown in FIG. 2, the control information sensors 9 have a driver monitor camera 91, a touch sensor 92, a seating sensor 94, and a seatbelt buckle switch 95. In addition, as shown in FIG. 1, the control information sensors have a torque sensor 93, a vehicle speed sensor 96, and an accelerator position sensor 97.

The driver monitor camera 91 is set so that a camera lens faces the driver, and monitors the forward gaze of the driver (facial orientation and whether their eyes are open or closed). The touch sensor 92 (a capacitive sensor) is set in the steering wheel rim of the steering wheel 23, which is where the driver places their hands, and detects whether the driver has their hands on the steering wheel 23. The torque sensor 93 is installed in a steering force transmission unit of a steering mechanism, and detects whether a driver is adding steering torque to operate the steering wheel. The seating sensor 94 (a weight sensor) is set in a seat cushion 24 of a driver's seat, and detects whether the driver is seated. The seatbelt buckle switch 95 detects whether a seatbelt is locked. The vehicle speed sensor 96 detects the actual vehicle speed of the host vehicle. The accelerator position sensor 97 detects an accelerator depression when an accelerator operation has been performed by the driver.

Configuration of the Control Block of the Mode-Switching Controller

The configuration of a control block of the mode-switching controller 47 is described below, on the basis of FIG. 4, which shows the mode-switching controller 47 of the ADAS control unit 4.

Figure 4:
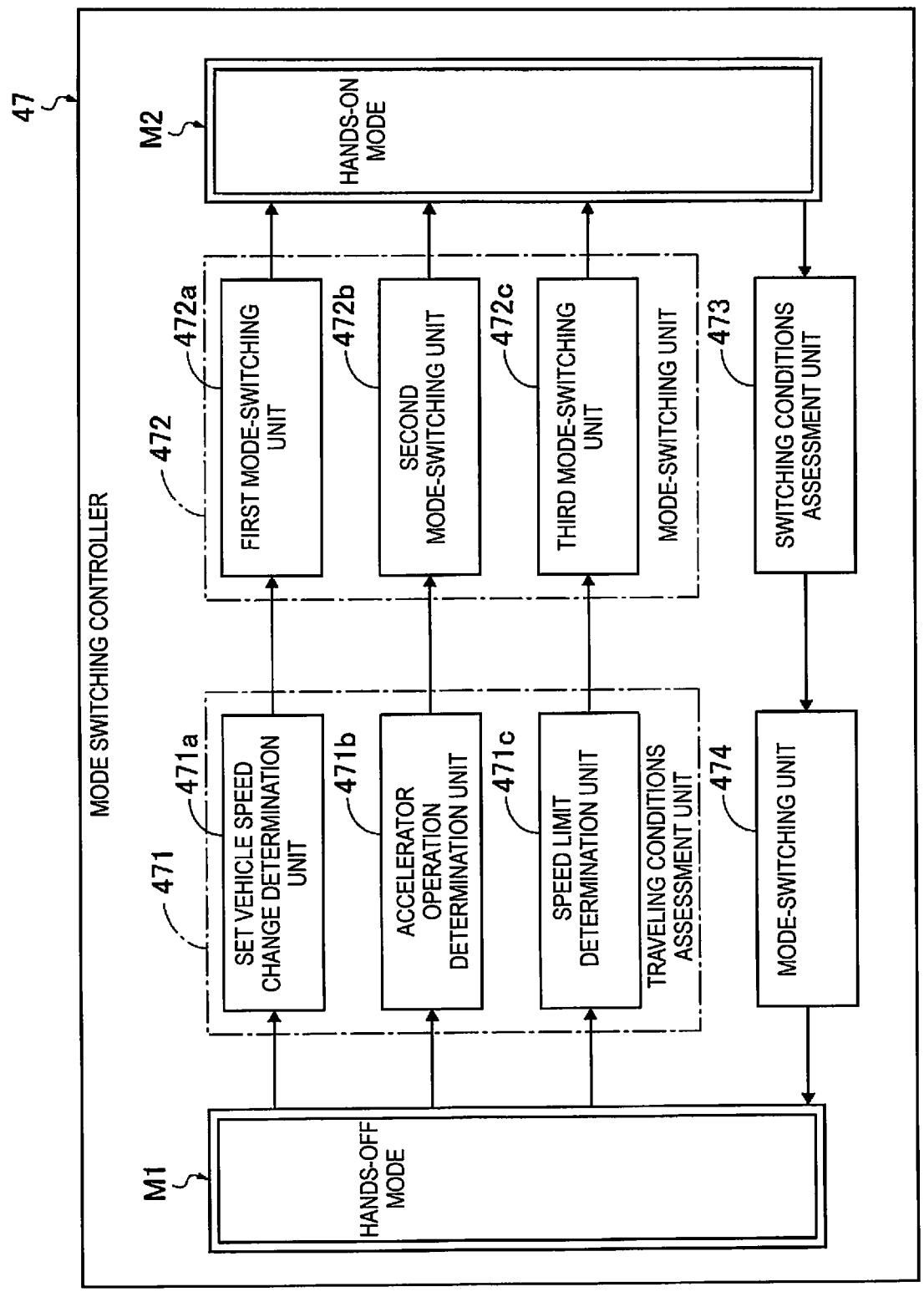
FIG. 4 is a control block diagram showing the configuration of a mode-switching controller of an ADAS control unit.

As shown in FIG. 4, the mode-switching controller 47 has a "hands-off mode M1" and a "hands-on mode M2" as lane-keeping assist modes, and is provided with a traveling conditions assessment unit 471 and a mode-switching unit 472. The mode-switching controller 47 is further provided with a switching conditions assessment unit 473 and a mode-switching unit 474.

During lane-keeping travel in which "hands-off mode M1" has been selected, the traveling conditions assessment unit 471 assesses whether or not the traveling condition that the actual vehicle speed of the host vehicle exceeds the speed limit of the roadway on which the host vehicle is traveling has been met.

If it is assessed that the traveling condition that the actual vehicle speed exceeds the speed limit has been met, the mode-switching unit 472 switches the lane-keeping assist mode from "hands-off mode M1" to "hands-on mode M2."

If "hands-on mode M2" has been selected, the switching conditions assessment unit 473 determines whether or not conditions for switching from "hands-on mode M2" to "hands-off mode M1" have been met. Here, multiple conditions are imposed as conditions for switching from "hands-on mode M2" to "hands-off mode M1," for instance, "the vehicle is traveling at a vehicle speed at or below the speed limit," "the driver is holding the steering wheel 23," and "the accelerator pedal is not depressed."

If the conditions for switching from "hands-on mode M2" to "hands-off mode M1" have been met, the mode-switching unit 474 switches the lane-keeping assist mode from "hands-on mode M2" to "hands-off mode M1." If the multiple switching conditions mentioned above are all satisfied simultaneously, the switching conditions are deemed to have been met.

The vehicle speed/headway control function of the accelerator/brake assist controller 41 includes a function for allowing the set vehicle speed used in vehicle speed/headway control to be changed through driver operation. In association with this set vehicle speed change function, the traveling conditions assessment unit 471 has a set vehicle speed change determination unit 471*a*, and the mode-switching unit 472 has a first mode-switching unit 472*a*, as shown in FIG. 4.

During lane-keeping travel in which "hands-off mode M1" has been selected, the set vehicle speed change determination unit 471*a* determines whether or not the driver has performed an operation to raise the set vehicle speed above the speed limit.

If it is determined that the driver has performed an operation to raise the set vehicle speed and it is determined that the actual vehicle speed is equal to or greater than a vehicle speed assessment value (the speed limit+α), the first mode-switching unit 472*a* switches from "hands-off mode M1" to "hands-on mode M2."

The vehicle speed/headway control function of the accelerator/brake assist controller 41 includes a function for permitting acceleration via an accelerator-depressing operation of the driver. In association with this acceleration-permitting function, the traveling conditions assessment unit 471 has an accelerator operation determination unit 471*b*, and the mode-switching unit 472 has a second mode-switching unit 472*b*, as shown in FIG. 4.

The accelerator operation determination unit 471*b* determines whether or not the driver has performed an accelerator-depressing operation during lane-keeping travel in which "hands-off mode M1" has been selected. If it is determined that the driver has performed an accelerator-depressing operation, the driver is requested to hold the steering wheel. Even if it is determined that the driver has performed an accelerator-depressing operation, acceleration of the host vehicle in response to the accelerator-depressing operation is deferred without being performed.

If it is confirmed that the driver is holding the steering wheel 23, the second mode-switching unit 472*b* switches from "hands-off mode M1" to "hands-on mode M2." Acceleration of the host vehicle in response to the accelerator-depressing operation of the driver is started after the mode has been switched to "hands-on mode M2."

The vehicle speed/headway control function of the accelerator/brake assist controller 41 includes a function for overwriting the set vehicle speed used for vehicle speed/headway control with the detected speed limit if a speed limit has been detected for the roadway on which the host vehicle is traveling. In association with this set vehicle speed overwriting function, the traveling conditions assessment unit 471 has a speed limit determination unit 471*c*, and the mode-switching unit 472 has a third mode-switching unit 472*c*, as shown in FIG. 4.

The speed limit determination unit 471*c* determines whether or not a newly detected speed limit has decreased from the previous speed limit during lane-keeping travel in which "hands-off mode M1" has been selected.

After a set time has elapsed since the speed limit was determined to have decreased, the third mode-switching unit 472*c* determines whether or not the actual vehicle speed has exceeded the speed limit. If it is determined that the actual vehicle speed has exceeded the speed limit, the mode is switched from "hands-off mode M1" to "hands-on mode M2."

Configuration of the Control Process for Switching the Lane-Keeping Assist Mode

Below, the step-by-step configuration of the control process for step-by-step switching of the lane-keeping assist mode will be explained step-by-step on the basis of FIG. 5, which shows the flow of a control process for switching lane-keeping assist modes that is executed by the mode-switching controller 47 provided in the ADAS control unit 4. This process is started by the main switch 81 being turned on, and ends when driving assist control is deactivated.

In step S1, a determination is made as to whether or not the set/coast switch 83 has been pressed after the process has been started by the main switch 81 being pressed. In the case of YES (the set/coast switch has been pressed), the process proceeds to step S2, and in the case of NO (the set/coast switch has not been pressed), the determination performed in step S1 is repeated.

In step S2, following a determination in S1 that the set/coast switch was pressed or a NO determination in S4, S19, or S21, a determination is made as to whether or not a speed limit has not been detected for the roadway being traveled or speed limit assist has been turned off. In the case of YES (speed limit has not been detected, or the like), the process proceeds to step S3, and in the case of NO (speed limit has been detected, or the like), the process proceeds to step S5.

That is, if a speed limit of the roadway being traveled has been detected, and speed limit assist has been turned on, speed limit assist uses the speed limit as the set vehicle speed, and driving assist control by the ADAS control unit 4 is activated by the selection of "hands-on mode M2." If no speed limit of the roadway being traveled has been detected, or if speed limit assist has been turned off, the speed when the set/coast switch 83 was pressed is used as the set vehicle speed. Then, driving assist control by the ADAS control unit 4 is activated by the selection of "hands-on mode M2."

In step S3, following a determination in S2 that no speed limit has been detected, or the like, "hands-on mode M2" is selected as the lane-keeping assist mode, and the process proceeds to step S4.

In step S4, following the selection of "hands-on mode M2" in S3, a NO determination in S6, or S7, S12, S18, or S24, a determination is made as to whether or not conditions for deactivating driving assist control by the ADAS control unit 4 have been met. In the case of YES (deactivation conditions have been met), the process proceeds to the end, and in the case of NO (deactivation conditions have not been met), the process returns to step S2.

Here, the deactivation conditions are determined to have been met if any of the following operations has been detected: (a) pressing of the cancel switch 84, (b) pressing of the main switch 81, or (c) depression of the brake pedal (unless the vehicle has stopped under the vehicle speed/headway control function).

In step S5, following a determination in S2 that a speed limit has been detected, or the like, a determination is made as to whether "hands-on mode M2" has been selected. In the case of YES, ("hands-on mode M2" has been selected), the process proceeds to step S6, and in the case of NO ("hands-off mode M1" has been selected), the process proceeds to step S8.

In step S6, following a determination in S5 that "hands-on mode M2" has been selected, a determination is made as to whether or not hands-off conditions for switching from "hands-on mode M2" to "hands-off mode M1" have been met. In the case of YES (hands-off conditions have been met), the process proceeds to step S7, and in the case of NO (hands-off conditions have not been met), the process proceeds to step S4.

In step S7, following a determination in S6 that the hands-off conditions have been met, the mode is switched from "hands-on mode M2" to "hands-off mode M1," and the process proceeds to step S4.

In step S8, following a determination in S5 that "hands-off mode M1" has been selected, a determination is made as to whether or not the set vehicle speed is higher than the detected speed limit. In the case of YES (set vehicle speed>speed limit), the process proceeds to step S9, and in the case of NO (set vehicle speed≤speed limit), the process proceeds to step S14.

In step S9, following a determination in S8 that set vehicle speed>speed limit, a determination is made as to whether or not the driver has performed an operation to raise the set vehicle speed. In the case of YES (an operation has been performed to raise the set vehicle speed), the process proceeds to step S10, and in the case of NO (no operation has been performed to raise the set vehicle speed), the process proceeds to step S12.

In step S10, following a determination in S9 that an operation has been performed to raise the set vehicle speed, a determination is made as to whether or not the actual vehicle speed has risen to at least a vehicle speed assessment value, which is the speed limit with an error allowance a added. In the case of YES, (actual vehicle speed≥vehicle speed assessment value), the process proceeds to step S11, and in the case of NO (actual vehicle speed<vehicle speed assessment value), the process proceeds to step S4. When the set vehicle speed is to be raised, the set vehicle speed rises by a prescribed vehicle speed (for instance, 5 km/h) if the switch is operated by being pressed once by the driver.

In step S11, following a determination in S10 that actual vehicle speed≥vehicle speed assessment value or a determination in S13 that vehicle speed difference>vehicle speed threshold value, the mode is switched from "hands-off mode M1" to "hands-on mode M2," and the process proceeds to step S4.

In step S12, following a determination in S9 that no operation to raise the set vehicle speed has been performed, a determination is made as to whether or not a speed limit for the roadway on which the host vehicle is traveling has been newly detected and a prescribed time has elapsed since the newly detected speed limit decreased. In the case of YES (the set time has elapsed since the speed limit decreased), the process proceeds to step S21, and in the case of NO (the set time has not elapsed since the speed limit decreased), the determination of step S20 is repeated. Here, when speed limit assist overwrites the set vehicle speed in association with a decrease in the speed limit, the "set time" is decided on the basis of the necessary time required, from the time the set vehicle speed is overwritten, for the actual vehicle speed to converge with the set vehicle speed after overwriting.

In step S13, following a determination in S12 that the set time has elapsed since the speed limit decreased, a determination is made as to whether or not a vehicle speed difference found by subtracting the speed limit from the actual vehicle speed has exceeded a vehicle speed threshold value that indicates that the vehicle speed has converged. In the case of YES, (vehicle speed difference>vehicle speed threshold value), the process proceeds to step S11, and in the case of NO (vehicle speed difference≤vehicle speed threshold value), the process proceeds to step S4.

In step S14, following a determination in S8 that set vehicle speed≤speed limit, a determination is made as to whether or not an accelerator-depressing operation has been performed by the driver. In the case of YES (an accelerator-depressing operation has been performed), the process proceeds to step S15, and in the case of NO (no accelerator-depressing operation has been performed), the process proceeds to step S4.

In step S15, following a determination in S14 that an accelerator-depressing operation has been performed, a determination is made as to whether or not the driver has taken their hands off the steering wheel 23. In the case of YES (hands have been taken off the steering wheel 23), the process proceeds to step S16, and in the case of NO (hands are on the steering wheel 23), the process proceeds to step S20.

In step S16, following a determination in S15 that hands have been taken off the steering wheel 23, the driver is notified by display, announcement, or the like to put their hands on the steering wheel 23, and the process proceeds to step S16.

In step S17, following the notification of the driver in S16, a determination is made as to whether or not the driver has put their hands on the steering wheel 23. In the case of YES (hands are on the steering wheel 23), the process proceeds to step S18, and in the case of NO (hands have been taken off the steering wheel 23), the process proceeds to step S4.

In step S18, following a determination in S15 that hands are on the steering wheel 23, or a determination in S17 that hands are on the steering wheel 23, the mode is switched from "hands-off mode M1" to "hands-on mode M2," and the process proceeds to step S19.

In step S19, following the switch to "hands-on mode M2" in S18, acceleration in response to the accelerator-depressing operation of the driver is started, and the process proceeds to step S4. That is, even if an accelerator-depressing operation of the driver is detected in step S14, actual acceleration of the host vehicle is deferred until the mode has been switched to "hands-on mode M2."

Next, background technology and measures for solving the problem will be explained. The operation of the first embodiment will be divided into "operation of the control process for switching lane-keeping assist modes" and "operation of mode-switching control for each traveling condition in which the speed limit is exceeded" for description.

A driving-assisted vehicle is known that has a vehicle speed/headway control function and a lane-keeping function as driving assist functions to assist driving operations of a driver, that has as a condition that a driver has their hands on a steering wheel, and that performs lane-keeping travel while remaining within a single lane.

This driving-assisted vehicle has as a condition that the driver has their hands on the steering wheel, but there is a demand to further raise the level of driving assistance and make it possible to provide driving assistance that does not have as a condition that the driver has their hands on the steering wheel.

However, in order to advance the level of driving assistance and establish driving assistance that does not have as a condition that the driver has their hands on the steering wheel, it becomes necessary to demand that provisions be made for the driver to have their hands on the steering wheel, and for driving assistance to be cancelled in traveling states in which it is possible that the lane-keeping function will not be maintained. This demand is not present in conventional driving assist system, in which cancellation of driving assist is always possible, in which it is presumed that the driver always has their hands on the steering wheel.

In contrast, in the technology described in Patent Citation 1, information is only transmitted from the system to the driver through notification using displays or announcements. Thus, the problem has arisen that, if the level of driving assistance is advanced and driving-assisted vehicles are developed that do not have as a condition that hands are on the steering wheel, it may not be possible to encourage the driver to perform appropriate actions by transmitting information from the system to the driver through notifications alone.

To address this problem, the present inventors and others focused on the fact that, in addition to providing simple notifications, it is necessary to alert the driver in order for the driver to receive information transmitted from the system and to respond to that information.

In the driving assist method of the present disclosure, on the basis of this point of focus, it is assessed in the lane-keeping assist mode whether or not the traveling condition that the actual vehicle speed of the host vehicle exceeds the speed limit of a roadway on which the host vehicle is traveling has been met during lane-keeping travel in which the hands-off mode, which allows the driver to remove their hands from the steering wheel 23, has been selected. A solution has been employed in which the mode is switched from "hands-off mode M1" to "hands-on mode M2," which has as a condition that the driver has their hands on the steering wheel 23, if it is assessed that the traveling condition that the actual vehicle speed exceeds the speed limit has been met.

For instance, during lane-keeping travel enabled by the selection of "hands-off mode M1," if the driver raises the set vehicle speed, if the driver performs an accelerator-depressing operation, if the speed limit for the roadway being traveled drops, or the like, the actual vehicle speed will end up exceeding the speed limit. When this occurs, if only a notification appealing to the visual sense or the auditory sense is provided, the driver might leave their hands off the steering wheel 23, and there is a risk that alerting of the driver will be insufficient, and that immediate steering wheel operations will also be delayed. Specifically, in cases in which the speed limit changes, it is even more probable that the driver will leave their hands off the steering wheel 23 than in cases based on driver operations.

To account for this, the mode is switched from "hands-off mode M1" to "hands-on mode M2," which has as a condition that the driver has their hands on the steering wheel 23, if it is assessed that the traveling condition that the actual vehicle speed exceeds the speed limit has been met. That is, in travel scenarios in which the actual vehicle speed exceeds the speed limit, if the driver takes their hands off the steering wheel 23, the mode is switched to "hands-on mode M2," in which the driver is made to put their hands on the steering wheel 23. Thus, a switch is made to a mode that appeals to the tactile sense of the driver, it can be ensured that the driver is reliably alerted that the actual vehicle speed is exceeding the speed limit. Furthermore, immediate steering wheel operations can also be accommodated by the driver having their hands on the steering wheel 23.

Thus, in a travel scenario in "hands-off mode M1," in which the level of driver assistance is raised, if there are assessed to be traveling conditions present that require alerting the driver, the driving assistance level is lowered to "hands-on mode M2," in which the driver is made to put their hands on the steering wheel 23. Put another way, utilizing the switch to "hands-on mode M2," in which the driving assistance level is lowered, as a backup countermeasure makes it possible to establish a driving assist system in which it is possible to select "hands-off mode M1," in which the driving assistance level is raised. Then, allowing the selection of "hands-off mode M1," which enables hands-off travel similar to autonomous driving, makes it possible to encourage travel that uses appropriate driving assistance with a raised level of driving assistance.

Here, in cases in which the mode is switched from "hands-off mode M1" to "hands-on mode M2," the visual sense and the auditory sense are appealed to through changes in the display produced by the head-up display 61 and the meter display 62 and through announcements. This will be explained below on the basis of FIG. 6 and FIG. 7.

Figure 6:
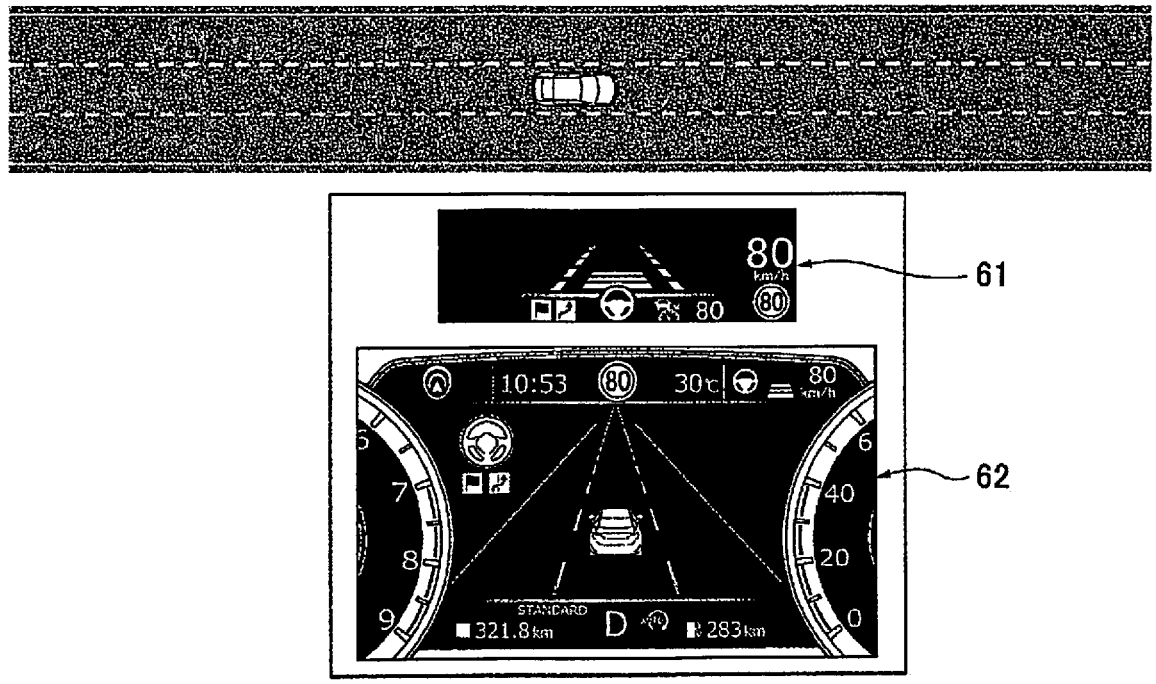
FIG. 6 is a diagram showing an example of a travel status of a host vehicle with a hands-off mode selected and an example of a hands-off mode display.

First, the head-up display 61 and the meter display 62 have a steering wheel icon display unit, a speed limit display unit, a set vehicle speed display unit, a message display unit, a lane/host vehicle display unit, and the like. Then, while "hands-off mode M1" is selected, the steering wheel icon display unit, for instance, displays in blue and displays an icon of the steering wheel alone, as shown in FIG. 6.

Figure 7:
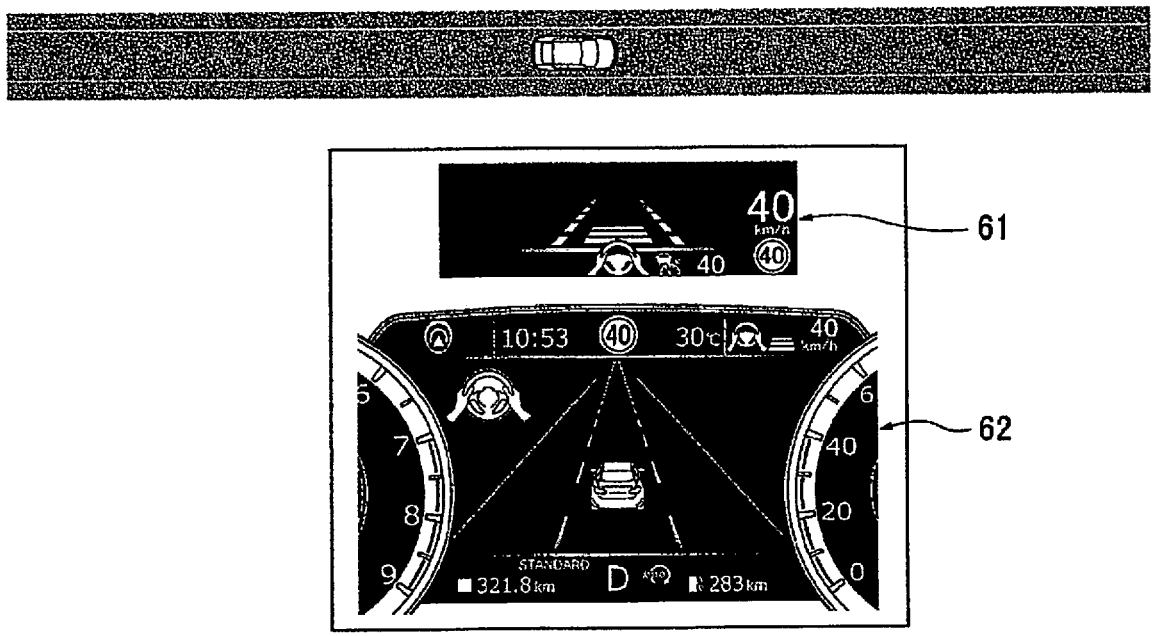
FIG. 7 is a diagram showing an example of a travel status of the host vehicle with a hands-on mode selected and an example of a hands-on mode display.

If "hands-on mode M2" is selected, the steering wheel icon display unit, for instance, displays in green, and displays icons of the steering wheel and hands, as shown in FIG. 7. Then, "please hold the steering wheel" is displayed on the message display unit and is announced.

Thus, in cases in which the mode is switched from "hands-off mode M1" to "hands-on mode M2," the driver can be notified that the lane-keeping assist mode has been switched through changes in the display produced on the head-up display 61 and the meter display 62. It can be confirmed that the driver has their hands on the steering wheel 23 using a sensor signal from the touch sensor 92 and/or the torque sensor 93.

Operation of the Control Process for Switching the Lane-Keeping Assist Mode

The operation of the control process for switching the lane-keeping assist mode, which is executed by the mode-switching controller 47, is explained below on the basis of the flowchart shown in FIG. 5. In the following explanation, the actual vehicle speed is referred to as VR, the speed limits as VL(n) and VL(n+1), the set vehicle speeds as VS(n) and VS(n+1), the vehicle speed difference as ΔV, and the vehicle speed threshold value as Vth.

First, after the main switch 81 is pressed, the driver accelerates or decelerates to the desired set speed. When the set/coast switch 83 has been pressed, if a speed limit VL(n) for the roadway being traveled is not detected or if speed limit assist has been turned off, the process proceeds in the order S1→S2→S3→S4. In S3, "hands-on mode M2" is selected as the lane-keeping assist mode. In S4, if the conditions for deactivating driving assist control are not met, the process returns to S2. That is, if no speed limit VL(n) has been detected for the roadway being traveled, or if speed limit assist has been turned off, the speed when the set/coast switch 83 was pressed is used as the set vehicle speed VS(n). Then, driving assist control by the ADAS control unit 4 is activated by the selection of "hands-on mode M2." Even after driving assist control has been activated, if a state in which a speed limit VL(n) is not detected or in which speed limit assist is off continues, the selection of "hands-on mode M2" is maintained.

When the set/coast switch 83 has been pressed after the main switch 81 was pressed, if a speed limit VL(n) for the roadway being traveled is detected, and speed limit assist has been turned on, the process proceeds in the order S1→S2→S5→S6. In S5, a determination is made as to whether or not "hands-on mode M2" has been selected, and in S6, a determination is made as to whether or not the conditions for switching from "hands-on mode M2" to "hands-off mode M1" have been met. That is, if the speed limit VL(n) has been detected for the roadway being traveled and speed limit assist has been turned on, speed limit assist uses the speed limit VL(n) as the set vehicle speed VS(n), and driving assist control by the ADAS control unit 4 is activated by the selection of "hands-on mode M2." Then, if the conditions for switching from "hands-on mode M2" to "hands-off mode M1" have been met, the process proceeds from S6 to S7→S4, and in S7, the mode is switched from "hands-on mode M2" to "hands-off mode M1."

When the set vehicle speed VS(n) has become greater than the detected speed limit VL(n) because the driver has performed an operation to raise the set vehicle speed VS(n) during travel in which "hands-off mode M1" has been selected, the process proceeds in the order S2→S5→S8→S9→S10. In S9, a determination is made as to whether or not the driver has performed an operation to raise the set vehicle speed VS(n). In S10, a determination is made as to whether or not the actual vehicle speed VR has risen to at least the vehicle speed assessment value (speed limit+α).

If it is determined in S10 that the actual vehicle speed VR has risen to at least the vehicle speed assessment value, the process proceeds from S10 to S11→S4. In S11, the mode is switched from "hands-off mode M1" to "hands-on mode M2."

If the set vehicle speed VS(n) is equal to or less than the detected speed limit VL(n) but the driver performs an accelerator-depressing operation during travel in which "hands-off mode M1" has been selected, the process proceeds in the order S2→S5→S8→S14→S15. In S14, a determination is made as to whether or not the driver has performed an accelerator-depressing operation. In S15, a determination is made as to whether or not the driver has taken their hands off the steering wheel 23.

In cases in which it is determined in S15 that the driver has taken their hands off the steering wheel 23, the process proceeds from S15 to S16→S17, and in S16, the driver is notified by display, announcement, or the like to put their hands on the steering wheel 23. In S17, a determination is made as to whether or not the driver has put their hands on the steering wheel 23. If it is determined in S17 that the driver has put their hands on the steering wheel 23, the process proceeds from S17 to S18, and in S18 the mode is switched from "hands-off mode M1" to "hands-on mode M2." If it is determined in S15 that the driver has put their hands on the steering wheel 23, the process proceeds from S15 to S18, and in S18, the mode is switched from "hands-off mode M1" to "hands-on mode M2."

If the mode is switched to "hands-on mode M2" in S18, the process proceeds from S18 to S19→S4. In S19, acceleration in response to the accelerator-depressing operation of the driver is started. That is, even if an accelerator-depressing operation of the driver is detected in S14, acceleration is deferred until the mode is switched to "hands-on mode M2," and acceleration is started after the mode has been switched to "hands-on mode M2."

In cases in which the set vehicle speed VS(n) is greater than the detected vehicle speed VL(n) and the set time T has elapsed since the newly detected speed limit VL(n+1) decreased from the current speed limit VL(n) during travel in which "hands-off mode M1" has been selected, the process proceeds in the order S2→S5→S8→S9→S12→S13.

If it is determined in S12 that the set time T has elapsed since the decrease of the speed limit VL(n+1) was detected, the process proceeds from S12 to S13, and in S13, a determination is made as to whether or not the vehicle speed difference ΔV, found by subtracting the speed limit VL(n+1) from the actual vehicle speed VR, has exceeded the vehicle speed threshold value Vth, which indicates that the vehicle speed has converged. If it is determined in S13 that vehicle speed difference ΔV≤vehicle speed threshold value Vth, the process proceeds from S13 to S4.

If it is determined in S13 that vehicle speed difference ΔV>vehicle speed threshold value Vth, the process proceeds from S13 to S11, and in S11 the mode is switched from "hands-off" mode M1 to "hands-on mode M2." If the conditions for deactivating driving assist control are met in S4, the process proceeds to the end, and driving assist control is deactivated.

Thus, in the control process for switching lane-keeping assist modes, in which "hands-off mode M1" and "hands-on mode M2" are switched between, the following control processes (a)-(e) are performed.

(a) In cases in which a speed limit VL(n) for the roadway on which the host vehicle is traveling has not been detected and in cases in which speed limit assist has been turned off, selection of "hands-off mode M1" is prohibited, and only "hands-on mode M2" is selected.

(b) During lane-keeping travel in which "hands-on mode M2" has been selected, a determination is made as to whether or not hands-off conditions have been met, and if the hands-off conditions are met, the mode is switched to "hands-off mode M1."

(c) During lane-keeping travel in which "hands-off mode M1" has been selected, in cases in which the set vehicle speed VS(n) has become greater than the detected speed limit VL(n) because the driver has performed an operation to raise the set vehicle speed VS(n), the mode is switched to "hands-on mode M2" on the condition that the actual vehicle speed VR has reached at least the vehicle speed assessment value (speed limit+α).

(d) During lane-keeping travel in which "hands-off mode M1" has been selected, in cases in which the set vehicle speed VS(n) is equal to or less than the detected speed limit VL(n) but the driver has performed an accelerator-depressing operation, the mode is switched to "hands-on mode M2" on the condition that the driver has put their hands on the steering wheel 23. After the mode has been switched to "hands-on mode M2," acceleration through the accelerator-depressing operation is started.

(e) During lane-keeping travel in which "hands-off mode M1" has been selected, in cases in which the set vehicle speed VS(n) has become greater than the detected speed limit VL(n) because a newly decreased speed limit VL(n+1) has been detected, the mode is switched to "hands-on mode M2" on the condition that the vehicle speed difference ΔV after the set time T has elapsed since detection exceeds the vehicle speed threshold value Vth.

Figure 8:
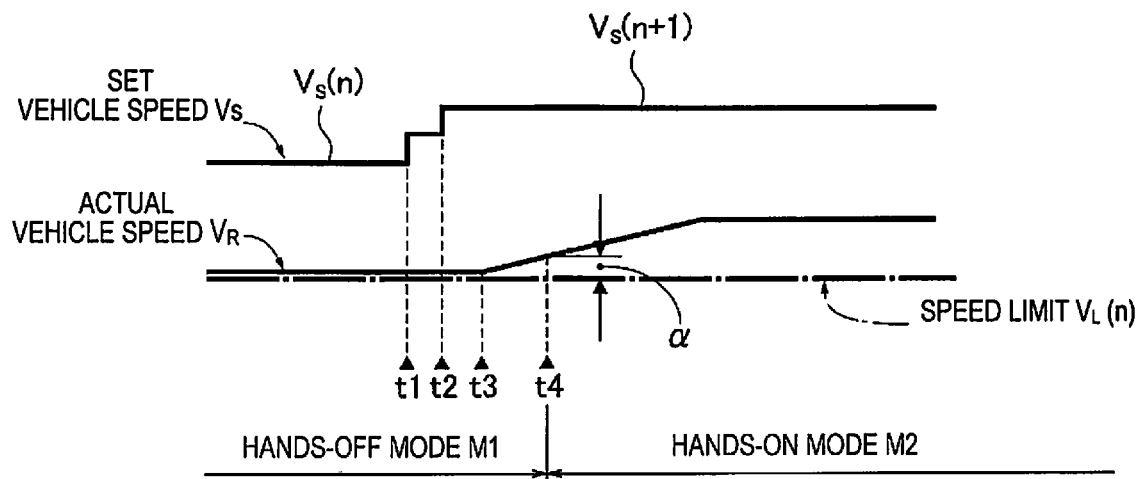
FIG. 8 is a time chart showing various characteristics when the lane-keeping assist mode is switched to the hands-on mode on the basis of a change in a set vehicle speed caused by a driver operation.

Operation of Mode-Switching Control for Each Traveling Condition in which the Speed Limit is Exceeded Among the control processes (a)-(e) described above, the control process (c) is mode-switching control due to an operation to raise the set vehicle speed VS. The operation of switching control of lane-keeping assist modes because of a change in the set vehicle speed VS due to a driver operation will be explained below, on the basis of the time chart shown in FIG. 8.

During lane-keeping travel in which "hands-off mode M1" has been selected and the speed limit VL(n) is being used as the set vehicle speed VS(n), the driver is considered to have twice performed a set vehicle speed changing operation to raise the set vehicle speed VS(n) above the speed limit VL(n). In this case, the rise of the actual vehicle speed VR is started at time t3 on the basis of the operation to raise the set vehicle speed VS(n). If the actual vehicle speed VR rises to at least the vehicle speed assessment value (speed limit VL(n)=α) at time t4, the mode is switched from "hands-off mode M1" to "hands-on mode M2."

Thus, during lane-keeping travel in which "hands-off mode M1" has been selected, if a set vehicle speed changing operation to raise the set vehicle speed VS(n) above the speed limit VL is performed, the actual vehicle speed VR rising to at least the vehicle speed assessment value is a condition for switching to "hands-on mode M2."

Figure 9:
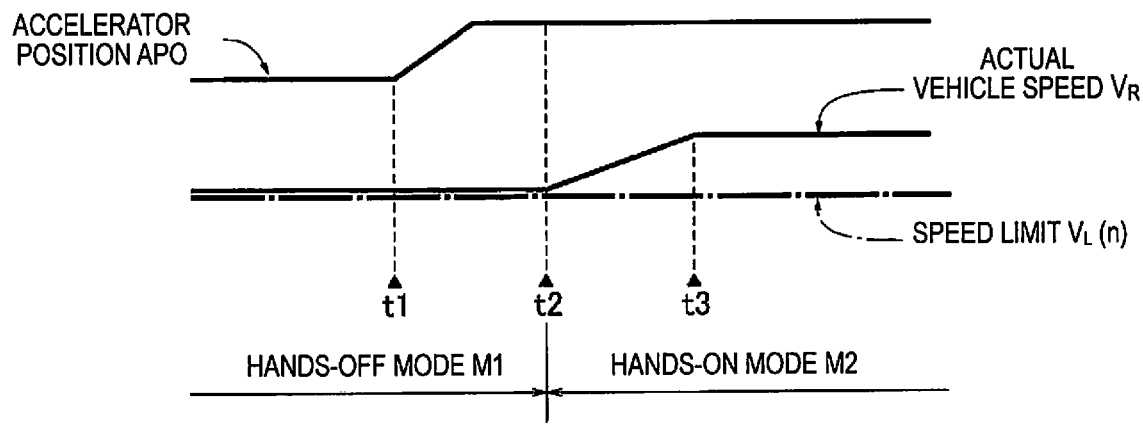
FIG. 9 is a time chart showing various characteristics when the lane-keeping assist mode is switched to the hands-on mode on the basis of depression of an accelerator by a driver.

Among the control processes (a)-(e) described above, the control process (d) is mode-switching control due to an accelerator-depressing operation. The operation of switching control of lane-keeping assist modes due to an accelerator-depressing operation of the driver will be explained below, on the basis of the time chart shown in FIG. 9.

During lane-keeping travel in which "hands-off mode M1" has been selected and the speed limit VL is being used as the set vehicle speed VS(n), the driver is considered to have performed an accelerator-depressing operation at time t1. In this case, the driver is requested to hold the steering wheel 23 at time t1, at which the driver performed the accelerator-depressing operation. If it is confirmed that the driver is holding the steering wheel 23 at time t2, the mode is switched from "hands-off mode M1" to "hands-on mode M2."

Thus, during lane-keeping travel in which "hands-off mode M1" has been selected, if the driver performs an accelerator-depressing operation, the driver holding the steering wheel 23 is a condition for switching to "hands-on mode M2." Then, after the mode has been switched to "hands-on mode M2" at time t2, acceleration of the host vehicle in response to the accelerator-depressing operation of the user is started, and the actual vehicle speed VR corresponding to the accelerator position is reached at time t3. That is, starting acceleration of the host vehicle has as a condition that the driver is holding the steering wheel 23 in preparation for steering wheel operations.

Among the control processes (a)-(e) described above, the control process (e) is mode-switching control due to a decrease in the speed limit VL(n). The operation of switching control of the lane-keeping assist mode due to a change in the speed limit VL(n) for the roadway on which the host vehicle is traveling is explained below, on the basis of the time chart shown in FIG. 10.

During lane-keeping travel in which "hands-off mode M1" has been selected and the speed limit VL(n) is being used as the set vehicle speed VS(n), the newly detected speed limit VL(n+1) is considered to have decreased from the previous speed limit VL(n) at time t1. In this case, a determination is made as to whether or not the actual vehicle speed VR has exceeded the speed limit VL(n+1) at time t2, which is when the set time T has elapsed since the newly detected speed limit VL(n+1) was determined to have decreased. If it is determined that the actual vehicle speed VR has exceeded the speed limit VL(n+1) (ΔV>Vth), the mode is switched from "hands-off mode M1" to "hands-on mode M2."

Figure 10:
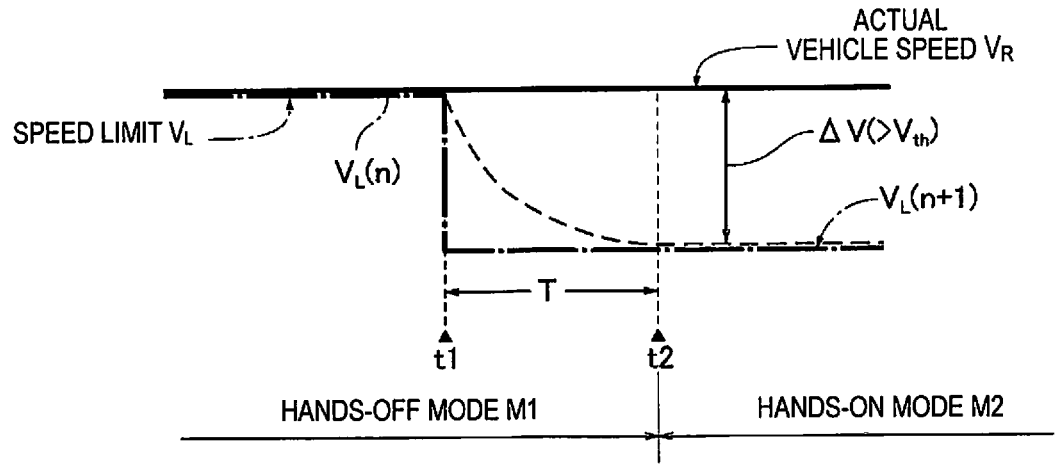
FIG. 10 is a time chart showing various characteristics when the lane-keeping assist mode is switched to the hands-on mode on the basis of a change in a speed limit of a roadway on which the host vehicle is traveling.

Thus, during lane-keeping travel in which "hands-off mode M1" has been selected, if the newly detected speed limit VL(n+1) decreases from the previous speed limit VL(n), the actual vehicle speed VR not converging with the speed limit VL(n+1) even after waiting the set time T is a condition for switching to "hands-on mode M2." If speed limit assist is functioning normally, the speed limit VL(n+1) newly detected at time t1 is used as the set vehicle speed VS(n+1), and the actual vehicle speed VR converges with the speed limit VL(n+1) at time 2, which is when the set time T has elapsed, as shown by the dashed line in FIG. 10.

As explained above, the driving assist method and driving assist device of the first embodiment exhibit the effects enumerated below.

(1) This driving assist method has a vehicle speed/headway control function and a lane-keeping function as driving assist functions to assist driving operations by the driver, and uses a mode-switching controller 47 for switching lane-keeping assist modes that assist a host vehicle to remain within a lane during travel. The driving assist method has, as the vehicle speed/headway control function, a function in which, in cases in which a speed limit for a roadway on which the host vehicle is traveling has been detected, a set vehicle speed used in vehicle speed control is overwritten with the speed limit. During lane-keeping travel in which "hands-off mode M1," which allows the driver to take their hands off a steering wheel 23, has been selected as the lane-keeping assist mode, a determination is made as to whether or not a traveling condition that an actual vehicle speed VR exceeds a speed limit VL(n) for a roadway on which the host vehicle is traveling has been met. When it is determined that the traveling condition that the actual vehicle speed VR exceeds the speed limit VL(n) has been met, the mode is switched from "hands-off mode M1" to "hands-on mode M2," which has as a condition that the driver has their hands on the steering wheel 23 (FIG. 4). Thus, it is possible to provide a driving assist method that encourages travel based on appropriate driving assistance by lowering the driving assistance level when alerting the driver is necessary in a lane-keeping travel scenario with a raised driving assistance level.

(2) During lane-keeping travel in which "hands-off mode M1" has been selected, a determination is made as to whether or not the driver has performed a set vehicle speed changing operation to raise the set vehicle speed VS(n) above the speed limit VL(n). When it is determined that the driver has performed an operation to raise the set vehicle speed VS(n) and it is determined that the actual vehicle speed VR has risen to at least the vehicle speed assessment value, found by adding an error allowance a to the speed limit VL(n), the mode is switched from "hands-off mode M1" to "hands-on mode M2" (in FIG. 5, S9→S10→S11). Thus, while "hands-off mode M1" has been selected, if the driver has performed a set vehicle speed changing operation to raise the set vehicle speed VS(n) above the speed limit VL, the mode can be switched to "hands-on mode M2" on the condition that the actual vehicle speed VR rises to at least the vehicle speed assessment value. In addition, a function can be provided for allowing the set vehicle speed VS(n), which is used for vehicle speed/headway control, to be changed through driver operation during lane-keeping travel based on the selection of "hands-off mode M1."

(3) During lane-keeping travel in which "hands-off mode M1" has been selected, a determination is made as to whether or not the driver has performed an accelerator-depressing operation. When it is determined that the driver has performed an accelerator-depressing operation, the driver is requested to hold the steering wheel 23, and when it is confirmed that the driver is holding the steering wheel 23, the mode is switched from "hands-off mode M1" to "hands-on mode M2" (in FIG. 5, S14→S18). Thus, while "hands-off mode M1" has been selected, when the driver performs an accelerator-depressing operation, the mode can be switched to "hands-on mode M2" on the condition that the driver is holding the steering wheel 23. In addition, a function can be provided for allowing acceleration based on an accelerator-depressing operation of the driver during lane-keeping travel based on selection of "hands-off mode M1."

Figure 5:
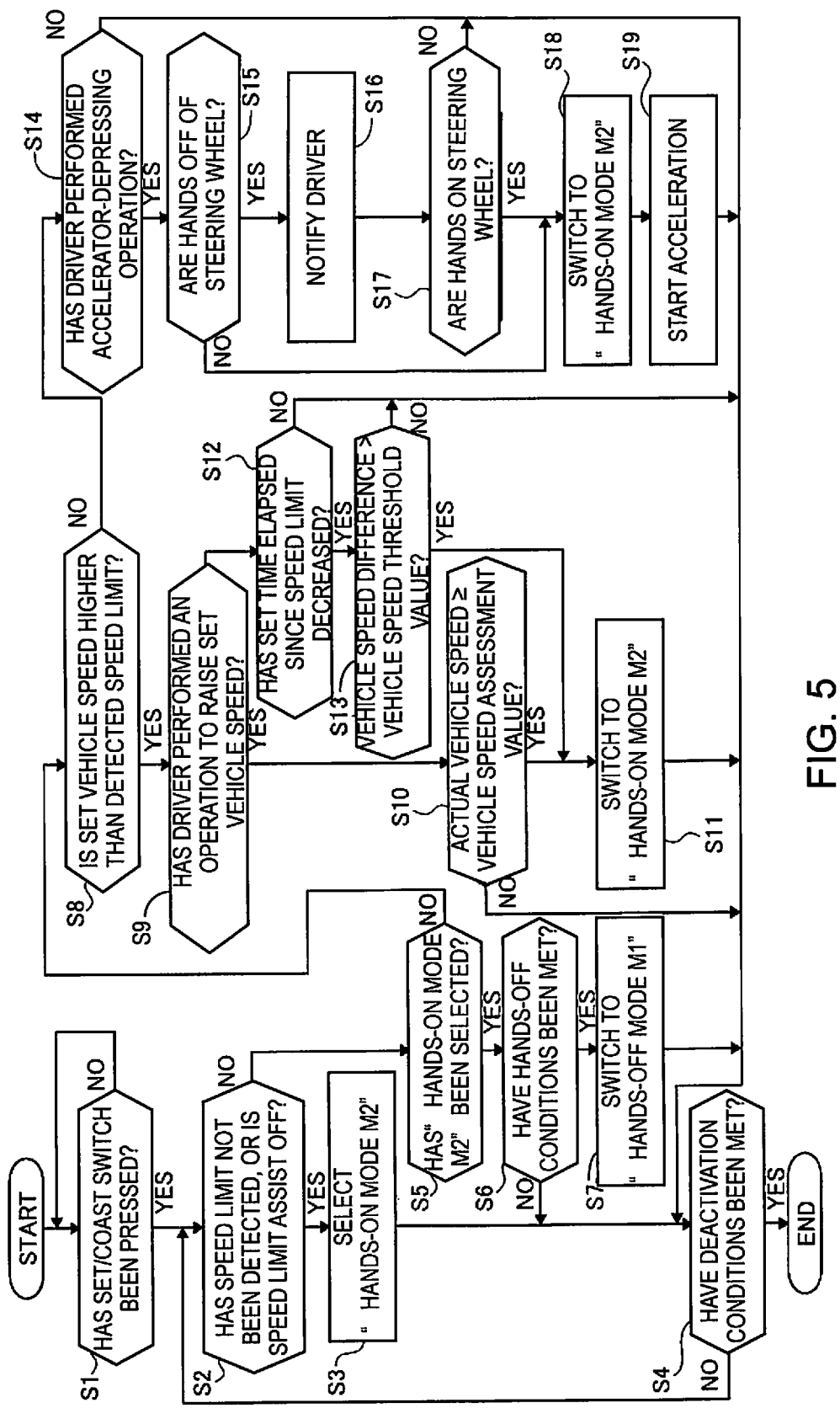
FIG. 5 is a flowchart showing the flow of a control process for switching lane-keeping assist modes that is executed by the mode-switching controller provided in the ADAS control unit.

(4) In cases in which the driver has performed an accelerator-depressing operation during travel in which "hands-off mode M1" has been selected, acceleration of the host vehicle is deferred until the mode has been switched to "hands-on mode M2," and acceleration of the host vehicle in response to the acceleration-depressing operation of the driver is started after the mode has been switched to "hands-on mode M2" (in FIG. 5, S18→S19). Thus, during lane-keeping travel in which "hands-off mode M1" has been selected, when the driver performs an accelerator-depressing operation, acceleration of the host vehicle can be started after transition to a state in which steering wheel operation by the driver is possible.

(5) During lane-keeping travel in which "hands-off mode M1" has been selected, a determination is made as to whether or not the newly detected speed limit VL(n+1) has decreased from the speed limit VL(n). After the set time T has elapsed since it was determined that the newly detected speed limit VL(n+1) decreased, a determination is made as to whether or not the actual vehicle speed VR has exceeded the speed limit VL(n+1). When it is determined that the actual vehicle speed VR has exceeded the speed limit VL(n+1), the mode is switched from "hands-off mode M1" to "hands-on mode M2" (in FIG. 5, S12→S13→S11). Thus, while "hands-off mode M1" has been selected, if the newly detected speed limit VL(n+1) has decreased from the previous speed limit VL(n), the mode can be switched to "hands-on mode M2" on the condition that the vehicle speed has not converged even after waiting the set time T. In addition, a function can be provided for overwriting the set vehicle speed VS(n+1) used for vehicle speed/headway control with the speed limit VL(n+1) if the speed limit VL(n+1) for the roadway on which the host vehicle is traveling is newly detected during lane-keeping travel based on the selection of "hands-off mode M1."

(6) In cases in which "hands-on mode M2" has been selected, conditions (hands-off conditions) for switching from "hands-on mode M2" to "hands-off mode M1" are determined. When the switching conditions (hands-off conditions) are met, the mode is switched from "hands-on mode M2" to "hands-off mode M1" (in FIG. 5, S5→S6→S7). Thus, in cases in which "hands-on mode M2" has been selected, it is possible to ensure travel segments in which "hands-off mode M1" is selected during lane-keeping travel are kept long by opening the possibility of restoring "hands-off mode M1."

(7) This driving assist device has a vehicle speed/headway control function and a lane-keeping function as driving assist functions to assist driving operations performed by a driver, and is provided with a mode-switching controller 47 for switching between lane-keeping assist modes that assist the host vehicle to remain within a lane during travel. The device has, as the vehicle speed/headway control function, a function in which, in cases in which a speed limit for a roadway on which the host vehicle is traveling has been detected, a set vehicle speed used in vehicle speed control is overwritten with the speed limit. The mode-switching controller 47 has: a traveling conditions assessment unit 471 that, during lane-keeping travel in which "hands-off mode M1," which allows the driver to take their hands off a steering wheel 23, has been selected as the lane-keeping assist mode, determines whether or not the traveling condition that an actual vehicle speed VR of the host vehicle exceeds a speed limit VL(n) for a roadway on which the host vehicle is traveling has been met; and a mode-switching unit 472 that, when it is determined that the traveling condition that the actual vehicle speed VR exceeds the speed limit VL(n) has been met, switches the mode from "hands-off mode M1" to "hands-on mode M2," which has as a condition that the driver has their hands on the steering wheel 23 (FIG. 4). Thus, it is possible to provide a driving assist device that encourages travel based on appropriate driving assistance by lowering the driving assistance level when alerting the driver is necessary in a lane-keeping travel scenario with a raised driving assistance level.

The driving assist method and the driving assist device of the present disclosure have been described above on the basis of the first embodiment. However, the specific configuration is not limited to this the first embodiment; design changes, additions, and the like can be made as long as these do not deviate from the scope of the invention as in the claims.

In the first embodiment, an example was presented that was based on the set vehicle speed change determination unit 471*a*, the accelerator operation determination unit 471*b*, and the speed limit determination unit 471*c* as the traveling conditions assessment unit 471. However, the traveling conditions assessment unit is not limited to these determination units, as long as the determination unit assesses whether or not the traveling condition has been met that the actual vehicle speed of the host vehicle exceeds the speed limit of the roadway on which the host vehicle is traveling during travel in which "hands-off mode M1" has been selected.

In the first embodiment, an example was presented in which the driving assist method and the driving assist device of the present disclosure were employed in a driving-assisted vehicle in which there was installed an advanced driver assist system (ADAS) that assists driving operations of the driver. However, the driving assist method and the driving assist device of the present disclosure can also be applied to a self-driving vehicle that performs operation assist control for drive, braking, and steering angle in accordance with a target travel path and that travels by autonomous driving (AD) when an autonomous driving mode is selected.

The invention claimed is:

1. A driving assist method that includes a vehicle speed/headway control function that performs a vehicle speed control based on a set vehicle speed and a lane-keeping function that assists a host vehicle to remain within a lane during travel as driving assist functions to assist driving operations by a driver, the driving assist method comprising:
    assessing whether or not a traveling condition that an actual vehicle speed of the host vehicle exceeds a speed limit of a roadway on which the host vehicle is traveling has been met during lane-keeping travel in a hands-off mode that allows the driver to remove their hands from the steering wheel as a lane-keeping assist mode; and
    switching the mode from the hands-off mode to a hands-on mode that has as a condition that the driver has their hands on the steering wheel upon assessing that the traveling condition that the actual vehicle speed exceeds the speed limit has been met.

2. The driving assist method as set forth in claim 1, further comprising
    determining whether or not the driver has performed a set vehicle speed changing operation to raise the set vehicle speed above the speed limit during lane-keeping travel in which the hands-off mode has been selected; and
    the switching of the mode from the hands-off mode to the hands-on mode being performed upon determining that the driver has performed the operation to raise the set vehicle speed and the actual vehicle speed has risen to at least a vehicle speed assessment value found by adding an error allowance to the speed limit.

3. The driving assist method as set forth in claim 1, further comprising
    determining whether or not the driver has performed an accelerator-depressing operation during lane-keeping travel in which the hands-off mode has been selected;
    requesting the driver to hold the steering wheel upon determining that the driver has performed the accelerator-depressing operation; and
    the switching of the mode from the hands-off mode to the hands-on mode being performed upon confirming that the driver is holding the steering wheel.

4. The driving assist method as set forth in claim 3, further comprising
    deferring acceleration of the host vehicle until the mode is switched to the hands-on mode in cases in which the driver performs the accelerator-depressing operation during lane-keeping travel in which the hands-off mode has been selected; and starting the acceleration of the host vehicle in response to the accelerator-depressing operation of the driver after the mode has been switched to the hands-on mode.

5. The driving assist method as set forth in claim 1, further comprising determining whether or not a newly detected speed limit has decreased from the previous speed limit during lane-keeping travel in which the hands-off mode has been selected;

after a set time has elapsed since the newly detected speed limit was determined to have decreased, determining whether or not the actual vehicle speed has exceeded the speed limit; and the mode is switched from the hands-off mode to the hands-on mode upon determining that the actual vehicle speed has exceeded the speed limit.

6. The driving assist method as set forth in claim 1, wherein conditions for switching from the hands-on mode to the hands-off mode are determined in cases in which the hands-on mode has been selected; and the mode is switched from the hands-on mode to the hands-off mode when the conditions for switching are met.

7. A driving assist device that includes a vehicle speed/headway control function that performs a vehicle speed control based on a set vehicle speed and a lane-keeping function that assists a host vehicle to remain within a lane during travel as driving assist functions to assist driving operations by a driver, the driving assist device comprising:

the driving assist device includes, as the vehicle speed/headway control function, a function in which, a set vehicle speed used in control is overwritten with a speed limit in cases in which the speed limit for a roadway on which the host vehicle is traveling has been detected; and a traveling conditions assessment unit that assesses whether or not a traveling condition has been met that an actual vehicle speed of the host vehicle exceeds a speed limit of a roadway on which the host vehicle is traveling during lane-keeping travel in a hands-off mode that allows the driver to remove their hands from the steering wheel as a lane-keeping assist mode; and a mode-switching unit that switches the mode from the hands-off mode to a hands-on mode, which has as a condition that the driver has their hands on the steering wheel, upon assessing that the traveling condition that the actual vehicle speed exceeds the speed limit has been met.

\* \* \* \* \*